US011005536B2

(12) United States Patent
Schelstraete

(10) Patent No.: US 11,005,536 B2
(45) Date of Patent: May 11, 2021

(54) COORDINATED BEAMFORMING WITH ACTIVE SYNCHRONIZATION

(71) Applicant: SEMICONDUCTOR COMPONENTS INDUSTRIES, LLC, Phoenix, AZ (US)

(72) Inventor: Sigurd Schelstraete, Menlo Park, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/749,743

(22) Filed: Jan. 22, 2020

(65) Prior Publication Data

US 2020/0280345 A1 Sep. 3, 2020

Related U.S. Application Data

(60) Provisional application No. 62/813,010, filed on Mar. 2, 2019.

(51) Int. Cl.
*H04B 7/024* (2017.01)
*H04B 7/0456* (2017.01)
(Continued)

(52) U.S. Cl.
CPC ........... *H04B 7/024* (2013.01); *H04B 7/0456* (2013.01); *H04L 27/2663* (2013.01); *H04W 84/12* (2013.01)

(58) Field of Classification Search
CPC ........ H04B 7/02; H04B 7/024; H04B 7/0404; H04B 7/0408; H04B 7/0452;
(Continued)

(56) References Cited

U.S. PATENT DOCUMENTS

| 6,411,612 B1 | 6/2002 | Halford et al. |
| 2014/0369278 A1* | 12/2014 | Song .................. H04L 1/20 370/329 |

(Continued)

FOREIGN PATENT DOCUMENTS

KR 20160009884 A 1/2016

OTHER PUBLICATIONS

International Search Report and Written Opinion, PCT/US2020/014800, dated Apr. 14, 2020.

*Primary Examiner* — Young T. Tse
(74) *Attorney, Agent, or Firm* — Maschoff Brennan

(57) ABSTRACT

A first transceiver communicates with a first station in a first network according to a first symbol alignment and includes a detection circuit and a precoding determination circuit. The detection circuit detects a signal in a second network from a second transceiver to a second station in the second network via receive chains, coverage areas of the first and second networks overlapping, and determines a second symbol alignment of the signal based on a preamble of the signal in the second network. The precoding determination circuit is coupled to transmit chains, determines a precoding matrix that creates a null in a location of the second station, and determines the first symbol alignment, which is synchronized with the second symbol alignment. The transmit chains pre-code a signal in the first network using the precoding matrix and align symbols of the signal in the first network according to the first symbol alignment.

20 Claims, 6 Drawing Sheets

(51) Int. Cl.
*H04L 27/26* (2006.01)
*H04W 84/12* (2009.01)

(58) Field of Classification Search
CPC .. H04B 7/0456; H04B 7/0617; H04B 7/0628; H04B 7/0634; H04L 25/0218; H04L 27/2663; H04W 80/12; H04W 84/12
USPC ....... 375/219, 220, 222, 260, 262, 265, 267, 375/299; 370/329, 334, 335, 337, 342, 370/347, 349, 350; 455/500, 502
See application file for complete search history.

(56) References Cited

U.S. PATENT DOCUMENTS

| | | | | |
|---|---|---|---|---|
| 2015/0036623 | A1* | 2/2015 | Maaref | H04L 1/004 |
| | | | | 370/329 |
| 2015/0131751 | A1* | 5/2015 | Bayesteh | H04B 7/0482 |
| | | | | 375/267 |
| 2015/0333844 | A1* | 11/2015 | Kim | H04W 56/001 |
| | | | | 455/63.1 |
| 2019/0199422 | A1* | 6/2019 | Li | H04B 7/0617 |
| 2019/0357162 | A1* | 11/2019 | You | H04W 56/001 |

* cited by examiner

COORDINATED BEAMFORMING WITH ACTIVE SYNCHRONIZATION

CROSS-REFERENCE TO RELATED APPLICATION

This patent application claims the benefit of and priority to U.S. Provisional App. No. 62/813,010 filed Mar. 2, 2019 titled "COORDINATED BEAMFORMING WITH ACTIVE SYNCHRONIZATION," which is incorporated in the present disclosure by reference in its entirety.

FIELD

The implementations discussed in the present disclosure are related to coordinated beamforming with active synchronization.

BACKGROUND

Unless otherwise indicated in the present disclosure, the materials described in the present disclosure are not prior art to the claims in the present application and are not admitted to be prior art by inclusion in this section.

Wireless networks (e.g., wireless local area networks) may include wireless access points (WAPs) and wireless stations (STAs) that communicate with each other. The wireless networks may be positioned within a close enough distance of each other that signals transmitted by the WAPs are received at areas where STAs of different wireless networks are physically positioned. For example, signals transmitted by a WAP of a first wireless network may be received at an area where a STA of a second wireless network is physically positioned.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One or more implementation of the present disclosure may include a first multiple input multiple output (MIMO) transceiver. The first MIMO transceiver may be configured to communicate with a first wireless station in a first wireless network according to a first symbol alignment. The first MIMO transceiver may include a signal detection circuit. The signal detection circuit may be coupled to a plurality of receive chains. The signal detection circuit may be configured to detect a signal in a second wireless network via the receive chains. The signal in the second wireless network may be from a second MIMO transceiver to a second wireless station in the second wireless network. A coverage area of the second wireless network may at least partially overlap a coverage area of the first wireless network. The signal detection circuit may also be configured to determine a second symbol alignment of the signal in the second wireless network. The second symbol alignment may be determined based on a preamble of the signal in the second wireless network. The first MIMO transceiver may also include a precoding determination circuit. The precoding determination circuit may be coupled to a plurality of transmit chains. The precoding determination circuit may be configured to determine a precoding matrix. The precoding matrix may be configured to create a null in a location where the second wireless station is physically positioned. The precoding determination circuit may also be configured to determine the first symbol alignment. The first symbol alignment may be synchronized with the second symbol alignment. The transmit chains may be configured to precode a signal in the first wireless network using the precoding matrix. The transmit chains may also be configured to align symbols of the signal in the first wireless network according to the first symbol alignment.

One or more implementations of the present disclosure may include a method to operate a first MIMO transceiver. The first MIMO transceiver may be configured to communicate with a first wireless station in a first wireless network according to a first symbol alignment. The method may include detecting a signal in a second wireless network. The signal in the second wireless network may be from a second MIMO transceiver to a second wireless station in the second wireless network. A coverage area of the second wireless network may at least partially overlap a coverage area of the first wireless network. The method may also include determining a second symbol alignment of the signal in the second wireless network. The second symbol alignment may be determined based on a preamble of the signal in the second wireless network. In addition, the method may include determining a precoding matrix. The precoding matrix may be configured to create a null in a location where the second wireless station is physically positioned. Further, the method may include determining the first symbol alignment. The first symbol alignment may be synchronized with the second symbol alignment. The method may include precoding a signal in the first wireless network. The signal in the first wireless network may be pre-coded using the precoding matrix. The method may also include aligning symbols of the signal in the first wireless network. The symbols of the signal in the first wireless network may be aligned according to the first symbol alignment.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific implementations thereof which are illustrated in the appended drawings. It is appreciated that these drawings depict only example implementations of the invention and are therefore not to be considered limiting of its scope. The invention will be described and explained with additional specificity and detail through the use of the accompanying drawings in which.

DETAILED DESCRIPTION OF SOME EXAMPLE IMPLEMENTATIONS

Figure 1A:
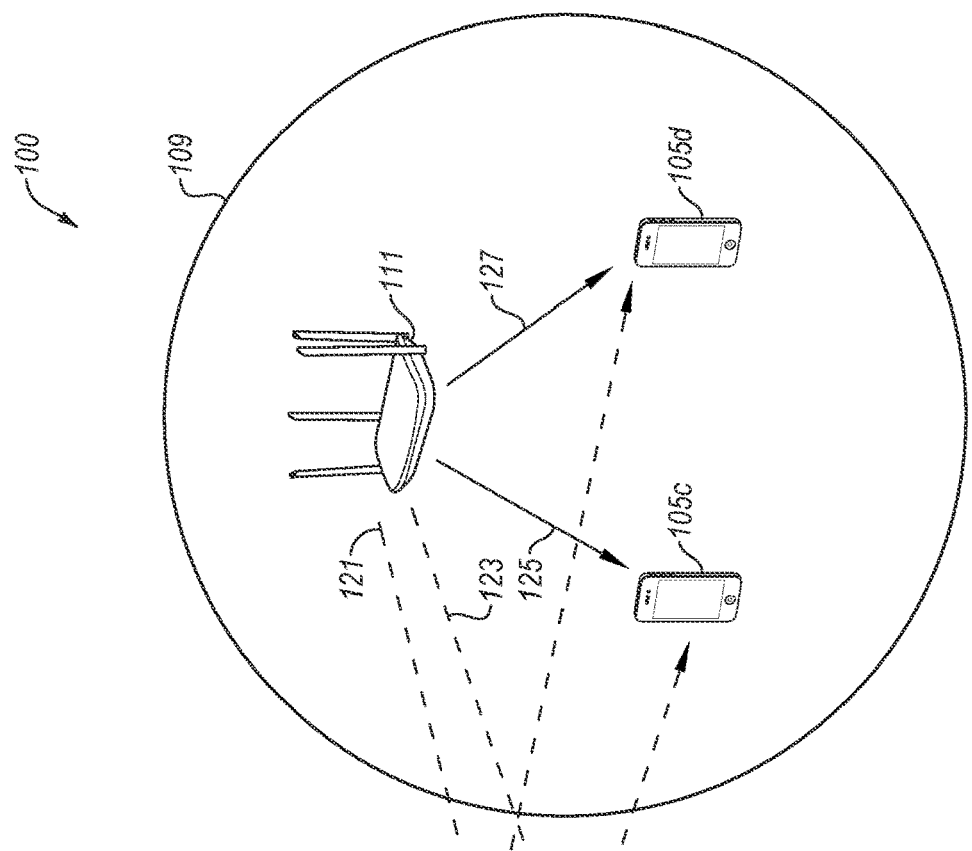
FIG. 1A illustrates an example environment in which a first WAP and a second WAP may be implemented.
Figure 1A:
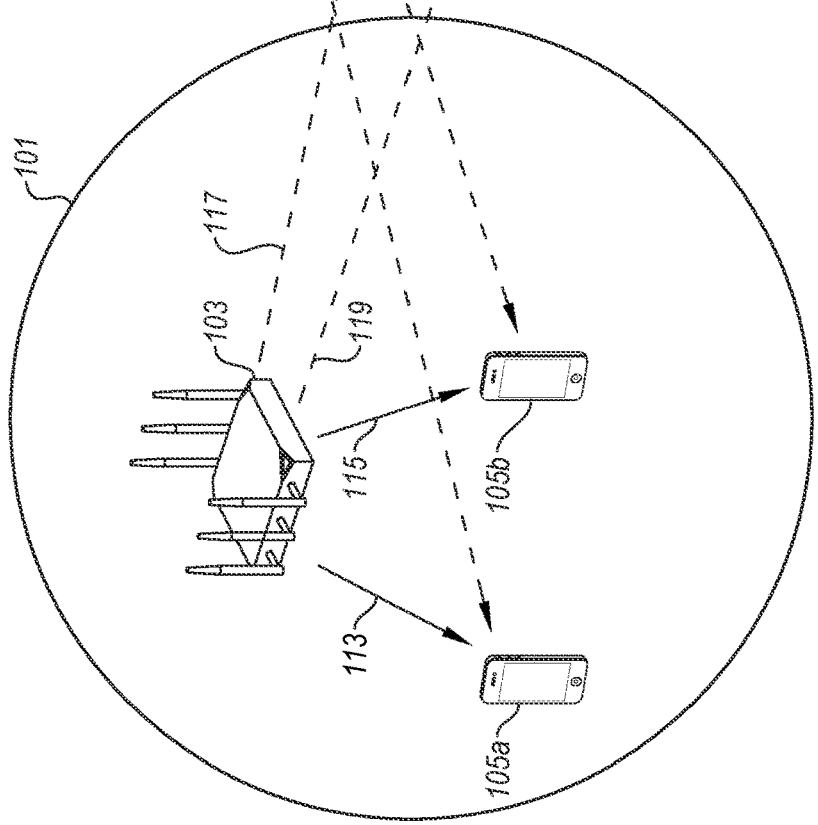

A wireless network (e.g., a wireless local area network (WLAN)) may include a WAP that communicates with one or more STAs. The WAP and/or the STAs may include a MIMO transceiver to send and/or receive wireless communications. Each MIMO transceiver may include multiple communication chains to permit simultaneous wireless communication between the MIMO transceiver and other wireless devices. Each communication chain may include a receive chain configured to wirelessly receive and process signals from the other wireless devices. In addition, each communication chain may include a transmit chain configured to process and amplify signals prior to transmission. As described above, signals transmitted by a WAP of a first wireless network may be received at an area where a STA of a second wireless network is physically positioned. In some implementations, beamforming techniques may be implemented by the WAPs to create nulls in areas where adjacent wireless networks overlap. Such areas may be referred to as overlap areas or target areas. The nulls may reduce interference the STAs experience in the target areas.

Accordingly, in some implementations, the MIMO transceiver may perform operations associated with beamforming a signal (applying precoding to steer the energy in a signal to or away from certain locations) for ongoing communications. In some implementations, beamforming may be used to enhance the signal towards particular STAs. Similarly, in some implementations, beamforming may be used to create a null in the signal (e.g., suppress the signal) towards the particular STAs by choosing an appropriate precoding matrix. Beamforming may cause the signal as transmitted to include the null (e.g., an amplitude of substantially zero energy) at an area where a STA (e.g., an overlapping STA) of a different wireless network (e.g., an overlapping wireless network) is physically positioned (e.g., the target area). As used in the present disclosure, the term substantially zero energy means a signal level that falls below the ambient or thermal noise present at the receiver.

In some implementations, the signal may be pre-coded according to corresponding coefficient values in the precoding matrix. The WAP may include multiple antennas that transmit the pre-coded signal on a channel (e.g., a WLAN channel). The pre-coded signal as transmitted by the different antennas (e.g., the transmitted signal) may cause destructive interference to occur at the target area. The destructive interference may create the null at a predetermined location (e.g., the target area). For example, the signal may be transmitted by the antennas such that the null is created by destructive interference occurring between multiple instances of the signal wirelessly transmitted by multiple antennas.

In wireless protocols using orthogonal frequency-division multiplexing (OFDM) modulation (such as Wi-Fi), transmitted signals may consist of a high number of concurrent low-bandwidth signals (called "tones" or "subcarriers"). In Wi-Fi, precoding may be applied to each tone individually. This may also be referred as precoding in the frequency domain. The time-domain channel may be converted to the frequency domain (using e.g. a Fourier Transform) to determine the appropriate precoding matrix for each tone. One of the properties of the Fourier Transform is that a linear convolution in the time domain is equivalent to a per-tone multiplication in the frequency domain (or circular convolution). However, this property may only apply to periodic signals. OFDM modulation may apply a cyclic extension to each modulation period that may create a signal that is "locally" periodic. The cyclic extension of OFDM symbols may be such that circular convolution is valid on parts of the transmitted signal when a length of a channel impulse response (e.g., a response of the channel to a pulse signal being received) is shorter than a duration of cyclic extension. However, this periodicity may be broken at the transition to the next OFDM symbol.

As a result, the transmitted signal at the target area may not include a continuous null (e.g., a continuous amplitude of zero energy) in a time domain (e.g., a representation of amplitude versus time). The transmitted signal at the target area may be represented in the time domain as a linear convolution of the transmitted signal with the channel impulse response. Because the linear convolution may not be equivalent to circular convolution outside the areas where the transmitted signal is locally periodic, the transmitted signal may be received at the target area exhibiting bursts of energy that occur in the time domain coinciding with transitions between symbols (e.g., OFDM symbols) of the transmitted signal. These bursts of energy may occur because the precoding matrix is derived in the frequency domain, but the transmitted signal is transmitted and received in the time domain.

In some signal detection methods, the bursts of energy may not be taken into consideration for determining a symbol alignment (e.g., a symbol timing) of the transmitted signal when wireless communication is already ongoing on the channel. In these and other signal detection methods, the WAP may determine the symbol alignment of the transmitted signal without taking into consideration how the bursts of energy may impact operation of the overlapping STA. When the transmitted signal reaches the target area, the transmitted signal, in the time domain, may overlay another signal that is being received by the overlapping STA. If the symbol alignment of the transmitted signal is different than the symbol alignment of the other signal, the bursts of energy may coincide with symbol bodies (i.e. the OFDM symbols prior to cyclic extension) of the symbols of the other signal. The bursts of energy coinciding with the symbol bodies may cause interference with the other signal. In some implementations, the interference may cause packet loss, delays in transmission, or other issues with wireless communication involving the overlapping STA.

Some implementations described in the present disclosure may synchronize the symbol alignment of the transmitted signal (e.g., the bursts of energy in the time domain) with the symbol alignment of a signal transmitted as part of ongoing communication in the overlapping wireless network. According to at least one implementation in the present disclosure, a first WAP (e.g., an initiating WAP) of a first wireless network may include a first MIMO transceiver. The first MIMO transceiver may include a signal detection circuit and a precoding determination circuit. The signal detection circuit may be coupled to receive chains of the communication chains. The precoding determination circuit may be coupled to transmit chains of the communication chains.

The first MIMO transceiver may determine a signal is to be transmitted to a first STA of the first wireless network (e.g., a signal in the first wireless network) according to a first symbol alignment. The signal detection circuit may detect a signal in a second wireless network from a second MIMO transceiver (e.g., an overlapping MIMO transceiver of a second or overlapping WAP) to a second STA. A coverage area of the second wireless network may at least partially overlap a coverage area of the first wireless network. The signal detection circuit may determine a second symbol alignment of the signal in the second wireless network. In some implementations, the second symbol alignment of the signal in the second wireless network may be determined based on a preamble of the signal in the second wireless network.

The precoding determination circuit may determine a precoding matrix. The precoding matrix may be configured to create a null in a location where the second STA is physically positioned. The precoding determination circuit may determine the first symbol alignment. The first symbol alignment may be synchronized with the second symbol alignment. The transmit chains may pre-code the signal in the first wireless network using the precoding matrix. For example, each transmit chain may pre-code the signal in the first wireless network according to a corresponding coefficient value in the precoding matrix. The transmit chains may also align symbols of the signal in the first wireless network. The symbols of the signal in the first wireless network may be aligned according to the first symbol alignment. In some implementations, the transmit chains may provide the pre-coded and aligned signal in the first wireless network to antennas to wirelessly transmit. The antennas may wirelessly transmit the pre-coded and aligned signal in the first wireless network (e.g., the transmitted signal) in such a manner that the null (e.g., a signal null) of the transmitted signal is created in the frequency domain in the target area. In some embodiments, the pre-coded and aligned signal may be transmitted to avoid interference to concurrent transmissions of the second wireless network.

In some implementations, the first MIMO transceiver and the second MIMO transceiver may operate using a common time reference. For example, sampling clocks within the first MIMO transceiver and the second MIMO transceiver may be synchronized to the common time reference. As another example, symbols of signals transmitted by the first MIMO transceiver and the second MIMO transceiver may be synchronized by the common time reference.

According to at least one implementation described in the present disclosure, a burden of symbol synchronization (e.g., synchronizing symbol alignments) may be placed on the WAP that is to transmit (e.g., the initiating WAP) rather than the overlapping WAP. In addition, at least one implementation described in the present disclosure may permit multiple independent WAPs to operate without causing overlapping STAs to experience interference due to the bursts of energy in the time domain. Accordingly, at least one implementation described in the present disclosure may cause the transmitted signal to be transparent to the overlapping STA (e.g., a victim STA) due to the symbol synchronization.

Further, at least one implementation described in the present disclosure may determine specific precoding matrices for use when specific overlapping STAs are involved in the ongoing communication. For example, a first precoding matrix may be determined and used each time the WAP initiates communication while a first overlapping STA is involved in the ongoing communication. The specific precoding matrices may permit the WAPs to create the null towards a small number of overlapping STAs. In addition, in at least one implementation described in the present disclosure the symbol synchronization may occur without any participation or actions by the STAs.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

FIG. 1A illustrates an example environment 100 in which a first WAP 103 and a second WAP 111 may be implemented, in accordance with at least one implementation described in the present disclosure. The environment 100 (e.g., an operational environment) may also include a first STA 105a, a second STA 105b, a third STA 105c, and a fourth STA 105d (referenced collectively in the present disclosure as "STAs 105"). The first WAP 103, the first STA 105a, and the second STA 105b may form a first wireless network 101. In addition, the second WAP 111, the third STA 105c, and the fourth STA 105d may form a second wireless network 109. The circles representative of the first wireless network 101 and the second wireless network 109 as illustrated in FIG. 1A are provided for reference and do not represent actual coverage areas of the first wireless network 101 and the second wireless network 109. In some implementations, at least a portion of the actual coverage areas of the first wireless network 101 and the second wireless network 109 may overlap.

The first WAP 103 may be configured to permit simultaneous communication between the first WAP 103 and the first STA 105a and between the first WAP 103 and the second STA 105b. The second WAP 111 may be configured to permit simultaneous communication between the second WAP 111 and the third STA 105c and between the second WAP 111 and the fourth STA 105d. In some implementations, the first WAP 103 and the second WAP 111 may provide access to the Internet for the STAs 105. Example STAs 105 may include personal computers, printers, televisions, digital video disc (DVD) players, security cameras, smartphones, tablets, smart devices, or any other appropriate computing device configured for wireless communication.

In some implementations, the first WAP 103 and the second WAP 111 may implement the IEEE 802.11 standard which is a contention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". In addition, the first wireless network 101 and the second wireless network 109 may be implemented as hub and spoke networks. For example, the first WAP 103 may be the hub and the first STA 105a and the second STA 105b may be the spokes of the first wireless network 101. As another example, the second WAP 111 may be the hub and the third STA 105c and the fourth STA 105d may be the spokes of the second wireless network 109.

The first WAP 103 and the second WAP 111 may each include MIMO transceivers (not illustrated in FIG. 1A). For example, the first WAP 103 may include a first MIMO transceiver and the second WAP 111 may include a second MIMO transceiver. The MIMO transceivers may include multiple communication chains (not illustrated in FIG. 1A). The MIMO transceiver and communication chains of the first WAP 103 and the second WAP 111 are discussed in more detail below in relation to FIG. 2.

The first WAP 103 and the second WAP 111 may be configured to transmit beamformed signals that include symbol alignments that are selected by the first WAP 103 or the second WAP 111. The first WAP 103 and the second WAP 111 may be configured to transmit the beamformed signals such that versions of the beamformed signals that include data are present at areas the STAs 105 of the same wireless network are physically positioned. The versions of the beamformed signals transmitted by the first WAP 103 that include data are illustrated in FIG. 1A as solid arrows 113 and 115 while the versions of the beamformed signals transmitted by the second WAP 111 that include data are illustrated in FIG. 1A as solid arrows 125 and 127. In addition, the first WAP 103 and the second WAP 111 may be configured to transmit the beamformed signals such that each respective beamformed signal is nulled at the areas the STAs 105 of the other wireless network are physically positioned. The beamformed signal transmitted by the first WAP 103 in the area of the third and fourth STAs 105c, 105d is nulled as indicated by dashed arrows 117, 119 and the beamformed signal transmitted by the second WAP 111 in the area of the first and second STAs 105a, 105b is nulled as indicated by dashed arrows 121 and 123.

In some implementations, the nulls may not be temporally continuous. The nulls may include bursts of energy that coincide with transitions between symbols of the beamformed signal as discussed in more detail below in relation to FIGS. 3A and 3B. In these and other implementations, the bursts of energy may include parts of the signal that are not nulled in the time domain. If the beamformed signals transmitted by the first WAP 103 and the second WAP 111 include different symbol alignments, the STAs 105 may experience signal interference due to the bursts of energy even when nulling has been applied.

One or both of the first WAP 103 and the second WAP 111 may be configured to reduce interference experienced by the STAs 105 by synchronizing the symbol alignment of their respective beamformed signal. An example will now be described in which the first WAP 103 synchronizes the symbol alignment of its beamformed signal to symbol alignment of signals between the second WAP 111 and the third STA 105c to reduce interference experienced by the third STA 105c. The second WAP 111 may implement the same or similar processes to reduce interference experienced by the first and second STAs 105a, 105b.

The first WAP 103 may determine the signal in the first wireless network 101 (e.g., the beamformed signal) is to be transmitted to the first STA 105a or the second STA 105b. Prior to transmitting the signal in the first wireless network 101, the first WAP 103 may detect whether ongoing communication in the second wireless network 109 is present. In some implementations, the first WAP 103 may check for ongoing communication in the second wireless network 109 during a back-off period of time. In these and other implementations, the back-off period of time may include a period of time the first WAP 103 is to wait to transmit signals (e.g., a period of time the first WAP 103 is to delay transmissions). In response to detecting ongoing communication between the second WAP 111 and the third STA 105c when the first WAP 103 is preparing to send the signal in the first wireless network 101 to the first STA 105a or the second STA 105b, the first WAP 103 may determine the symbol alignment (e.g., a second symbol alignment) of a signal in the second wireless network 109 that is part of the ongoing communication.

In some embodiments, the first WAP 103 may receive and identify the preamble of the signal in the second wireless network 109. In these and other implementations, the first WAP 103 may extract or otherwise determine the second symbol alignment from the preamble. In addition, the first WAP 103 may determine the third STA 105c is intended to receive the signal in the second wireless network 109 based on the preamble.

The first WAP 103 may determine the precoding matrix (e.g., a first precoding matrix) that will result in a signal that reaches the first STA 105a and is nulled at the third STA 105c. The first precoding matrix may include a matrix of coefficients that each correspond to different antennas of the first WAP 103. In some implementations, the first precoding matrix may alternatively be called a first nulling matrix. In addition, the first WAP 103 may be configured to determine the symbol alignment (e.g., the first symbol alignment) that is synchronized with the second symbol alignment of the signal in the second wireless network 109.

The first WAP 103 may provide the first precoding matrix to the communication chains. The communication chains may pre-code the signal in the first wireless network based on the first precoding matrix. In addition, the communication chains may shift the symbol alignment in time of the signal in the first wireless network 101 to be synchronized with the second symbol alignment of the signal in the second wireless network 109.

In some implementations, the antennas of the first WAP 103 may wirelessly transmit the signal in the first wireless network 101 to create the null at the area where the third STA 105c is physically positioned. In addition, in some implementations, the antennas of the first WAP 103 may wirelessly transmit the signal in the first wireless network 101 such that symbol synchronization occurs between the signal in the first wireless network 101 and the signal in the second wireless network 109. The symbol synchronization of the signal in the first wireless network 101 and the signal in the second wireless network 109 may cause the bursts of energy present on the signal in the first wireless network 101 (e.g., signal) 119 to be positioned between the symbol bodies of the signal in the second wireless network 109 (e.g., signal 125) (e.g., positioned between symbols). The symbol synchronization may reduce and/or eliminate signal interference that is experienced by the third STA 105c.

In addition, in some implementations, after completing transmission of the signal in the first wireless network, the first WAP 103 may determine that another signal (e.g., a second signal in the first wireless network 101) is to be transmitted to the first STA 105a or the second STA 105b. The first WAP 103 may determine whether ongoing communication in the second wireless network 109 is present. In response to detecting ongoing communication between the second WAP 111 and the third STA 105c, the first WAP 103 may determine the first precoding matrix has already been created to reduce interference at the third STA 105c. The first WAP 103 may determine the first precoding matrix may be used again for transmitting the second signal in the first wireless network 101. The first WAP 103 may determine a symbol alignment (e.g., a third symbol alignment) of a signal in the second wireless network 109. Likewise, the first WAP 103 may determine a fourth symbol alignment that is synchronized with the third symbol alignment. The communication chains may pre-code the second signal in the first wireless network 101 according to the first precoding matrix. In addition, the communication chains may align the symbols of the second signal in the first wireless network according to the fourth symbol alignment. In addition, the antennas may wirelessly transmit the second signal in the first wireless network 101 such that the null is created in the target area while the second signal in the first wireless network 101 reaches the first STA 105a or the second STA 105b.

In some implementations, the precoding matrices may include matrices of coefficients for mapping amplification and precoding to be performed by the first WAP 103. In these and other implementations, each coefficient in the precoding matrices may describe portions of the signals in the first wireless network 101 that are to be transmitted by each antenna. For example, the precoding matrix may indicate that ten percent of the signals in the first wireless network 101 is to be transmitted on a first antenna, twenty percent of the signals in the first wireless network 101 is to be transmitted on a second antenna, fifty percent of the signals in the first wireless network 101 is to be transmitted on a third antenna, and twenty percent of the signals in the first wireless network 101 is to be transmitted on a fourth antenna.

The antennas of the first WAP 103 may wirelessly transmit the signals in the first wireless network 101 such that constructive interference of the various portions of the signal in the first wireless network 101 transmitted by the various antennas of the first WAP 103 occurs at the area where the first STA 105a or the second STA 105b are physically positioned. The antennas of the first WAP 103 may also wirelessly transmit the signals in the first wireless network 101 such that destructive interference of the various portions of the signals in the first wireless network 101 occurs in the target area (e.g., the areas where the third STA 105c or the fourth STA 105d are physically positioned). The destructive interference may create the null of the signals in the first wireless network 101 at the target area.

In some implementations, the signals in the first wireless network 101 may be wirelessly transmitted while ongoing communication in the second wireless network 109 is still being detected or received, e.g., at the third STA 105c. In addition, to reduce possible interference caused by the pre-amble of the signals in the first wireless network 101, the signals in the first wireless network 101 may be transmitted such that the pre-amble of signals transmitted as part of the ongoing communication and the preamble of the signals in the first wireless network 101 are aligned. The pre-amble of the signals transmitted as part of the ongoing communication and the preamble of the signals in the first wireless network 101 may be aligned in the time domain.

In some implementations, the first WAP 103 may repeat the process described above each time a signal in the first wireless network is to be transmitted while ongoing communication is present in the second wireless network 109. For example, the first WAP 103 may repeat this process and determine a second precoding matrix for ongoing communication that includes the second WAP 111 and the fourth STA 105d.

In some implementations, the second WAP 111 may operate the same as or similar to the first WAP 103. For example, the second WAP 111 may determine a third precoding matrix for ongoing communication in the first wireless network 101 that includes the first WAP 103 and the first STA 105a such that signals sent by the second WAP 111 to the third or fourth STAs 105c, 105d are nulled at the physical location of the first STA 105a during the ongoing communication in the first wireless network 101. As another example, the second WAP 111 may determine a fourth precoding matrix for ongoing communication in the first wireless network 101 that includes the first WAP 103 and the second STA 105b such that signals sent by the second WAP 111 to the third or fourth STAs 105c, 105d are nulled at the physical location of the second STA 105b during the ongoing communication in the first wireless network 101.

FIG. 1A illustrates the environment 100 with two wireless networks 101, 109. In another implementation, the environment 100 may include three or more wireless networks, as described with respect to FIG. 1B. For example, the environment 100 may include a third wireless network formed in part by a third WAP that includes a third MIMO transceiver. In some implementations the third WAP may operate the same as or similar to the first WAP 103. In addition, the first wireless network 101 and the second wireless network 109 are illustrated in FIG. 1A as including two STAs 105 each. In another implementation, the first wireless network 101 and the second wireless network 109 may include a different number of STAs 105. For example, the first wireless network 101 may include a single STA 105 and the second wireless network 109 may include three STAs 105. As another example, the first wireless network 101 and the second wireless network 109 may both include a single STA 105. More generally, each of the first and second wireless networks 101, 109 may include one or more STAs 105.

Figure 1B:
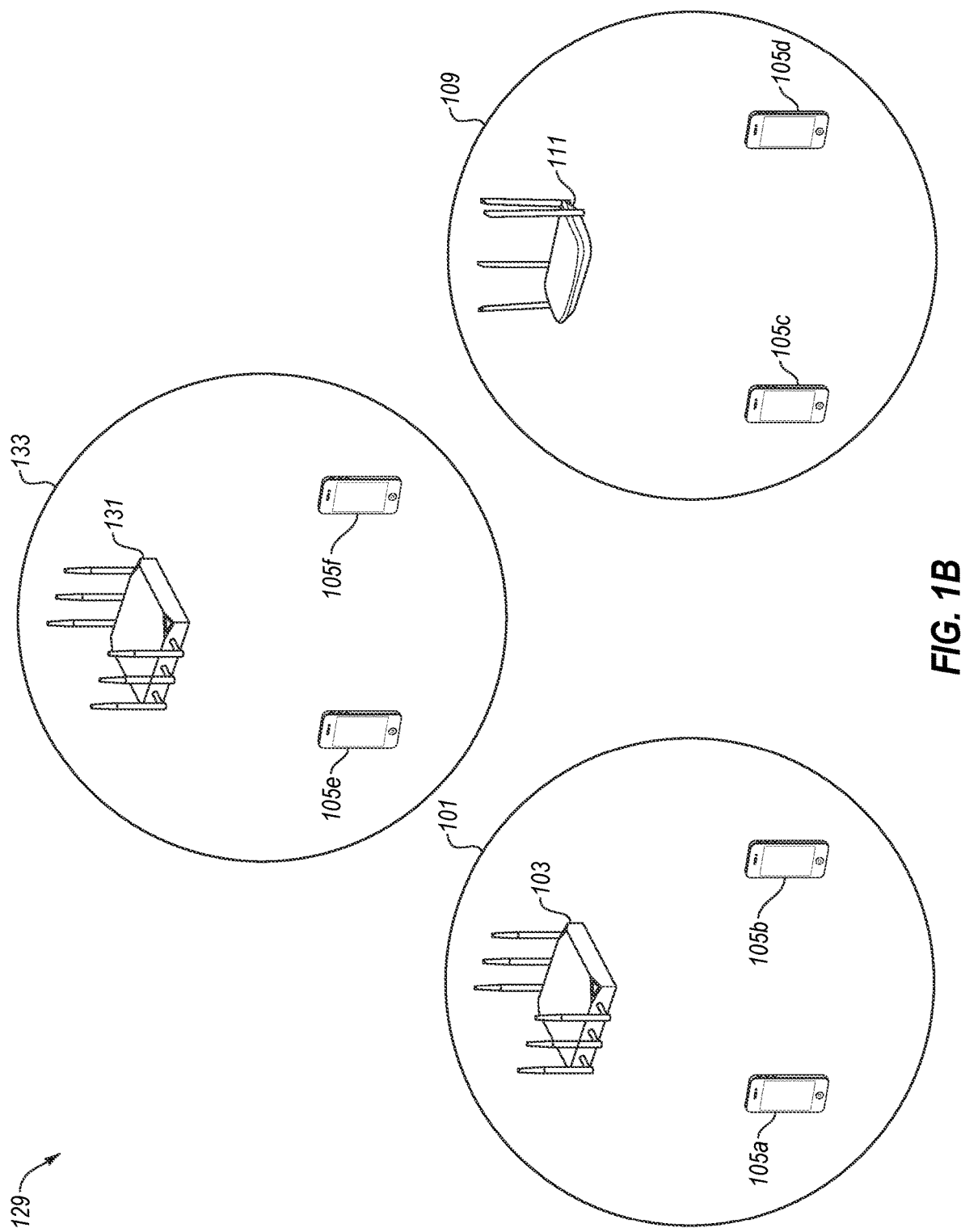
FIG. 1B illustrates another example environment in which the first WAP, the second WAP, and a third WAP may be implemented.

FIG. 1B illustrates another example environment 129 in which the first WAP 103, the second WAP 111, and a third WAP 131 may be implemented. The environment 129 (e.g., an operational environment) may also include the first STA 105a, the second STA 105b, the third STA 105c, the fourth STA 105d, a fifth STA 105e, and a sixth STA 105f (referenced collectively in the present disclosure as "STAs 105"). The first WAP 103, the first STA 105a, and the second STA 105b may form the first wireless network 101. The second WAP 111, the third STA 105c, and the fourth STA 105d may form the second wireless network 109. The third WAP 131, the fifth STA 105e, and the sixth STA 105f may form a third wireless network 133. The circles representative of the first wireless network 101, the second wireless network 109, and the third wireless network 133 as illustrated in FIG. 1B are provided for reference and do not represent actual coverage areas of the first wireless network 101, the second wireless network 109, and the third wireless network 133. In some implementations, at least portions of actual coverage areas of the first wireless network 101, the second wireless network 109, and/or the third wireless network 133 may overlap. The third WAP 131 may operate in the same or similar manner as one or both of the first WAP 103 and the second WAP 111.

Figure 2:
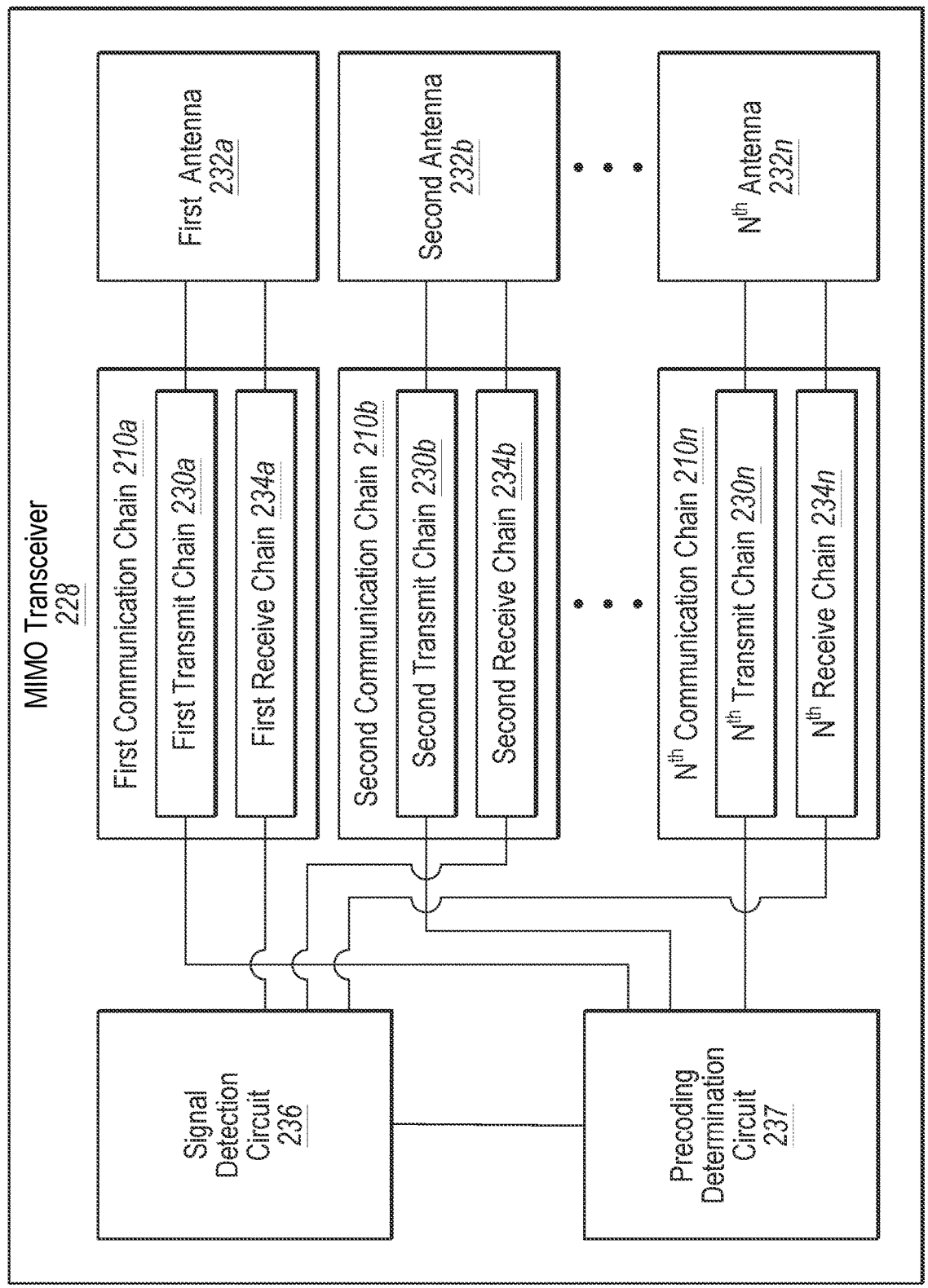
FIG. 2 illustrates an example MIMO transceiver that may be implemented in the environment of FIG. 1A.

FIG. 2 illustrates an example MIMO transceiver 228 that may be implemented in the environment 100 of FIG. 1A, in accordance with at least one implementation described in the present disclosure. The MIMO transceiver 228 may correspond to the first MIMO transceiver of the first WAP 103 or the second MIMO transceiver of the second WAP 111 of FIG. 1A. For example, the MIMO transceiver 228 may be configured to perform beamforming to reduce interference with ongoing communications in overlapping wireless networks.

The MIMO transceiver 228 may include a signal detection circuit 236, a precoding determination circuit 237, and two or more communication chains 210. In the illustrated implementation, the MIMO transceiver 228 includes a first communication chain 210*a*, a second communication chain 210*b*, and a N$^{th}$ communication chain 210*n* (referenced collectively in the present disclosure as "communication chains 210"). As indicated by the ellipsis and the N$^{th}$ communication chain 210*n* in FIG. 2, the MIMO transceiver 228 may include any appropriate number of communication chains 210.

The first communication chain 210*a* may include a first transmit chain 230*a* and a first receive chain 234*a*. The first transmit chain 230*a* and the first receive chain 234*a* may be coupled to a first antenna 232*a*. The second communication chain 210*b* may include a second transmit chain 230*b* and a second receive chain 234*b*. The second transmit chain 230*b* and the second receive chain 234*b* may be coupled to a second antenna 232*b*. The Nth communication chain 210*n* may include an Nth transmit chain 230*n* and an Nth receive chain 234*n*. The Nth transmit chain 230*n* and the Nth receive chain 234*n* may be coupled to an Nth antenna 232*n*. The first through Nth transmit chains 230*a*-230*n* and first through Nth receive chains 234*a*-234*n* may be referenced collectively in the present disclosure as, respectively, "transmit chains 230" and "receive chains 234".

The communication chains 210 and the antennas 232 may be used to receive signals and to transmit signals by the MIMO transceiver 228. For example, the antennas 232 may receive the signal transmitted as part of the ongoing communication between an overlapping MIMO transceiver and an overlapping STA. The receive chains 234 may process the signal. The signal detection circuit 236 may receive the signal from the receive chains 234.

The signal detection circuit 236 may determine the symbol alignment of the signal. For example, the signal detection circuit 236 may identify the preamble of the signal and may extract the symbol alignment of the signal from the preamble. In addition, the signal detection circuit 236 may determine the overlapping STA that is intended to receive the signal based on the preamble. The precoding determination circuit 237 may determine the precoding matrix specific to communication involving the overlapping STA, in which the precoding matrix that is specific to communication involving the overlapping STA is a precoding matrix that creates a null at the physical location of the overlapping STA. The precoding determination circuit 237 may determine the symbol alignment that is synchronized with the symbol alignment of the signal.

The precoding determination circuit 237 may provide the precoding matrix to the transmit chains 230. The transmit chains 230 may pre-code the signal to be transmitted according to the precoding matrix. In addition, the transmit chains 230 may align symbols of the signal to be transmitted according to the symbol alignment that is synchronized with the symbol alignment of the signal from the overlapping MIMO transceiver to the overlapping STA. The transmit chains 230 may provide the pre-coded and aligned signal to be transmitted to the antennas 232. The antennas may wirelessly transmit the pre-coded and aligned signal. The antennas 232 may wirelessly transmit the pre-coded and aligned signal to create the null in the frequency domain at the area where the overlapping STA is physically positioned.

Figure 3A:
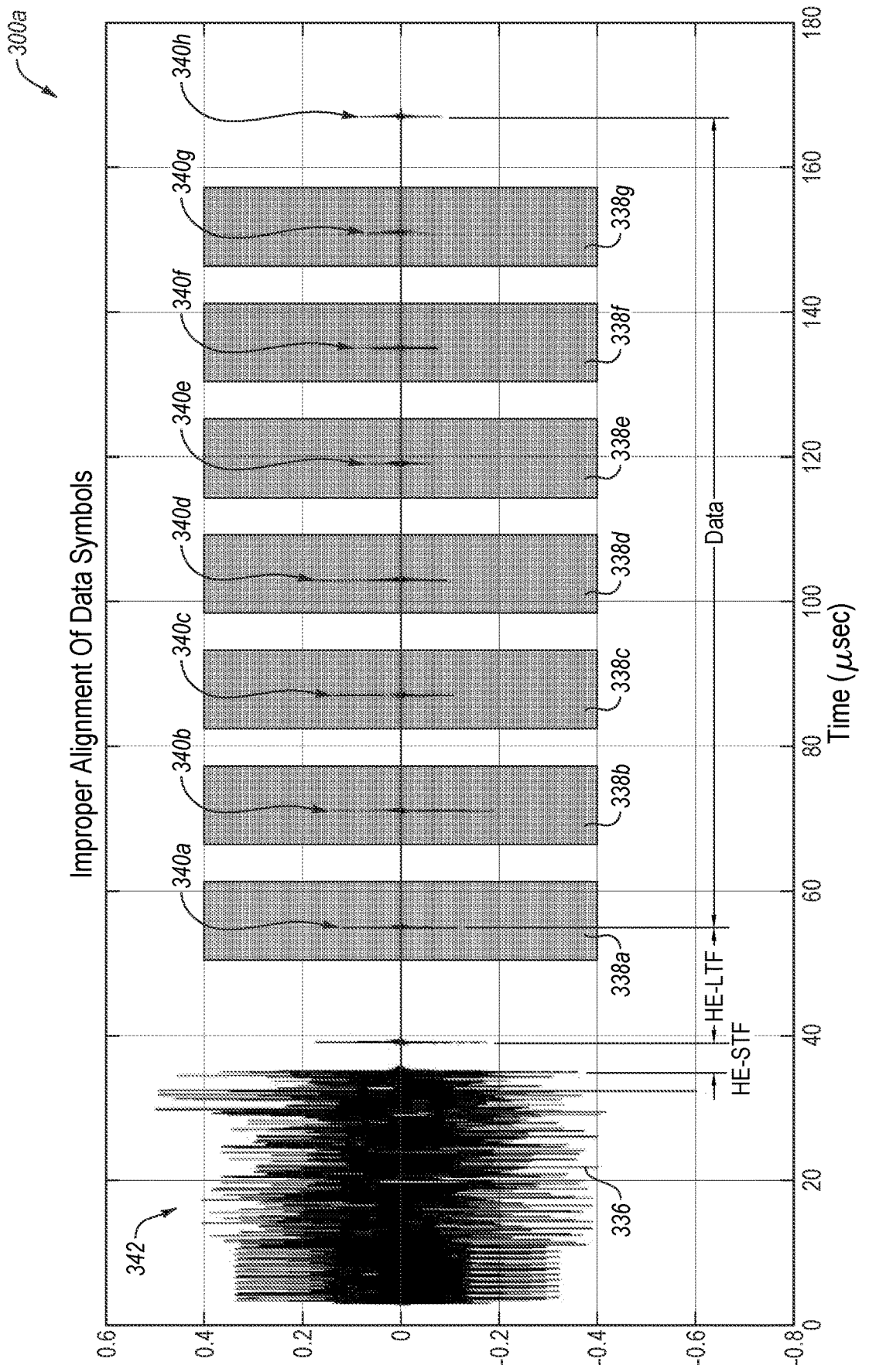
FIG. 3A illustrates a graphical representation of a simulation of an example pre-coded signal that creates a null in a time domain with a non-synchronized symbol alignment of a first example signal overlaid on the example pre-coded signal.

FIG. 3A illustrates a graphical representation 300*a* of a simulation of an example pre-coded signal 336 that creates the null in the time domain with a non-synchronized symbol alignment of a first example signal overlaid on the example pre-coded signal 336. Curve 336 may represent the example pre-coded signal at a location at which it is nulled. Section 342 of the example pre-coded signal 336 may represent the preamble of the example pre-coded signal 336. Bursts of energy 340*a*-*h* (generally referred to in the present disclosure as bursts of energy 340) may be present on the example pre-coded signal 336 in the time domain. In some implementations, the bursts of energy 340 may correspond to transitions between symbols of the example pre-coded signal 336.

For the simulation, the example pre-coded signal 336 was obtained by transmitting a data packet signal on an example channel. The signal was pre-coded according to an IEEE 802.11ax standard for the simulation. In addition, the signal included a single spatial stream and seven data symbols for the simulation. The preamble 342 was not pre-coded for the simulation. Example symbol bodies 338*a*-*g* (generally referred to in the present disclosure as symbol bodies 338) of the first example signal (e.g., signals transmitted as part of ongoing communication involving overlapping WAPs and STAs) have been overlaid on the example pre-coded signal 336. As illustrated in FIG. 3A, the example pre-coded signal 336 lacks a symbol alignment that is synchronized with the symbol alignment of the first example signal. Due to the lack of symbol synchronization, at least a portion of the bursts of energy 340 overlay the symbol bodies 338.

The bursts of energy 340 may cause noise to be received by the overlapping STA during periods of time that correspond to when the overlapping STA is supposed to be processing the first example signal. In some implementations, the overlapping STA may only process portions of the first example signal that correspond to the symbol bodies 338. In these and other implementations, additional sample periods may be placed on the first example signal to provide a buffer (e.g., a guard interval) against general effects of the channel, which may correspond to the transition between the corresponding symbols. The overlapping STA may experience interference when processing the first example signal due to the bursts of energy 340 being overlaid with the symbol bodies 338 (e.g., the symbol bodies 338 may be corrupted by the bursts of energy 340). In some implementations, the lack of symbol synchronization may be due to the overlapping STA selecting the symbol alignment based on a previously received or transmitted signal.

Figure 3B:
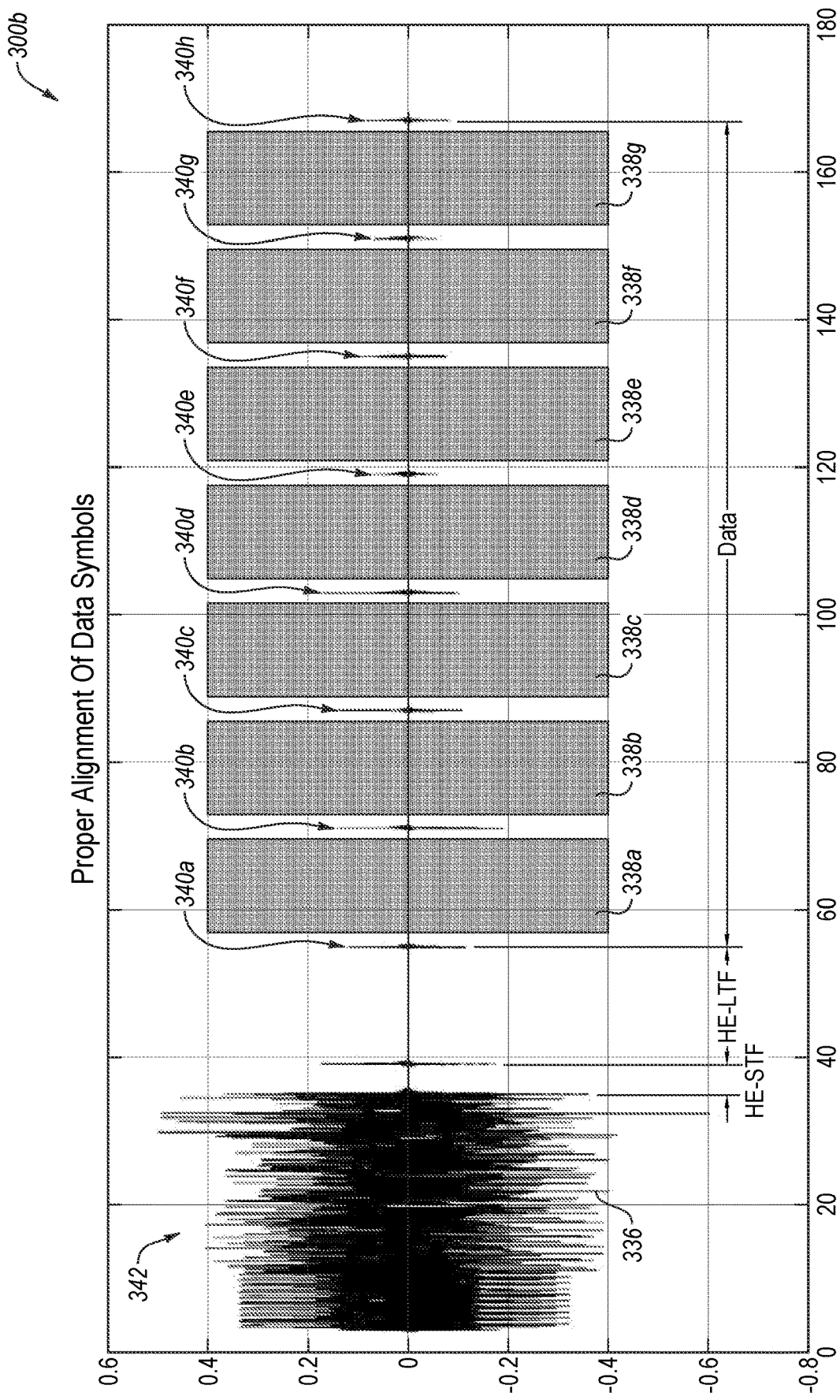
FIG. 3B illustrates a graphical representation of the simulation of the example pre-coded signal that creates the null in the time domain with a synchronized symbol alignment of a second example signal overlaid on the example pre-coded signal.

FIG. 3B illustrates a graphical representation 300*b* of the simulation of the example pre-coded signal 336 that creates the null in the time domain with a synchronized symbol alignment of a second example signal overlaid on the example pre-coded signal 336. As illustrated in FIG. 3B, the symbol bodies 338 of the second example signal are positioned on the example pre-coded signal 336 such that the symbol alignment of the example pre-coded signal 336 and the second example signal are synchronized. As illustrated in FIG. 3B, the symbol bodies 338 overlay the example pre-coded signal 336 but do not overlay the bursts of energy 340. The symbol synchronization may cause the bursts of energy 340 to be positioned between the symbol bodies 338 of the second example signal. With the bursts of energy 340 positioned between the symbol bodies 338 of the second example signal, the overlapping STA may not detect the bursts of energy 340 since it may not process the second example signal between symbols of the second example signal.

Figure 4:
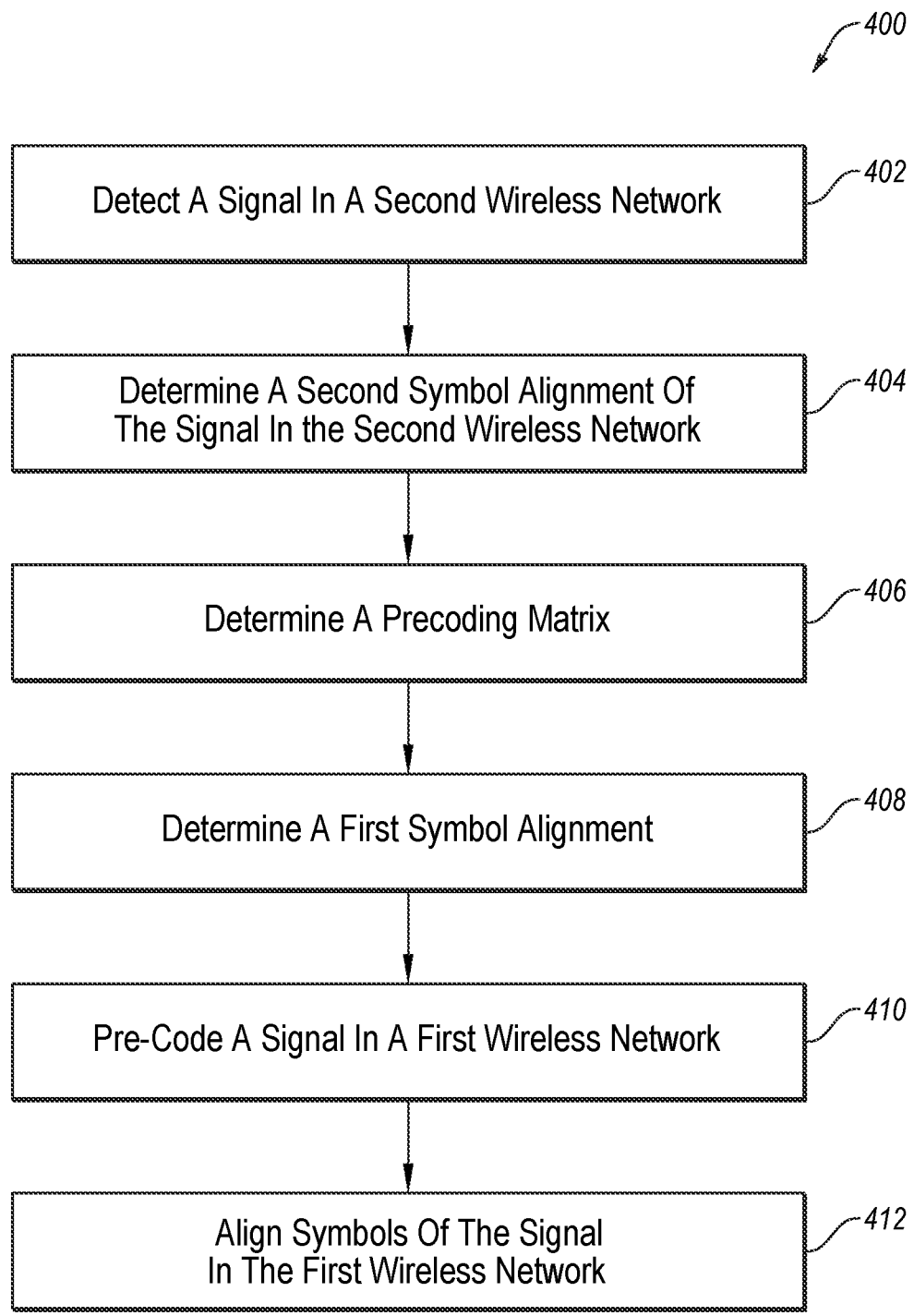
FIG. 4 illustrates a flowchart of an example method to operate a MIMO transceiver to communicate with a STA in a wireless network according to a first symbol alignment, all according to at least one implementation described in the present disclosure.

FIG. 4 illustrates a flowchart of an example method 400 to operate a MIMO transceiver to communicate with a STA in a wireless network according to a first symbol alignment, in accordance with at least one implementation described in the present disclosure. In some implementations, the method 400 of operating the MIMO transceiver may perform beamforming to reduce interference with ongoing communication in overlapping wireless networks. The method 400 may be performed by any suitable system, apparatus, or device. For example, the first WAP 103 or the second WAP 111 of FIG. 1A or the MIMO transceiver 228 of FIG. 2 may perform or direct performance of one or more of the operations associated with the method 400. The MIMO transceiver that performs or directs performance of the method 400 may be referred to as a first MIMO transceiver. The wireless network formed by the first MIMO transceiver may be referred to as a first wireless network. The STA with which the first MIMO transceiver communicates in the first wireless network may be referred to as a first STA. Although illustrated with discrete blocks, the steps and operations associated with one or more of the blocks of the method 400 may be divided into additional blocks, combined into fewer blocks, or eliminated, depending on the particular implementation.

The method 400 may include a block 402, at which a signal in a second wireless network may be detected. In some implementations the signal in the second wireless network may be from a second MIMO transceiver to a second STA in the second wireless network. A coverage area of the second wireless network may at least partially overlap a coverage area of the first wireless network. The signal may be transmitted as part of ongoing communication between the second MIMO transceiver and the second STA. In some implementations, the signal may be detected by the first MIMO transceiver of the first WAP 103 of FIG. 1A. In these and other implementations, the signal may be transmitted as part of ongoing communication between the second WAP 111 and the second STA 105b of FIG. 1A. Block 402 may be followed by block 404.

At block 404, a second symbol alignment of the signal in the second wireless network may be determined. The second symbol alignment may be determined based on a preamble of the signal in the second wireless network. The second symbol alignment may correspond to a position in time of symbols of the signal in the second wireless network. In some implementations, the signal detection circuit 236 of FIG. 2 may determine the second symbol alignment. Block 404 may be followed by block 406.

At block 406, a precoding matrix may be determined. The precoding matrix may be configured to create a null in a location where the second STA is physically positioned. In some implementations, the precoding matrix may be determined by the precoding determination circuit 237 of FIG. 2. In these and other implementations, the precoding matrix may be determined specific to communication involving the second STA. Block 406 may be followed by block 408. At block 408, the first symbol alignment may be determined. In some implementations, the first symbol alignment may be synchronized with the second symbol alignment. Block 408 may be followed by block 410.

At block 410, a signal in the first wireless network may be pre-coded. The first STA may be the intended recipient of the signal. The signal may be pre-coded using the precoding matrix. In some implementations, the transmit chains 230 of the MIMO transceiver 228 of FIG. 2 may pre-code the signal in the first wireless network according to the precoding matrix received from the precoding determination circuit 237. Block 410 may be followed by block 412. At block 412, symbols of the signal in the first wireless network may be aligned. The symbols of the signal in the first wireless network may be aligned according to the first symbol alignment. In some implementations, the transmit chains 230 of the MIMO transceiver of FIG. 2 may align the symbols of the signal in the first wireless network.

Modifications, additions, or omissions may be made to the method 400 without departing from the scope of the present disclosure. For example, the operations of the method 400 may be implemented in differing order. Additionally or alternatively, two or more operations of the method 400 may be performed at the same time. Furthermore, the outlined operations and actions of the method 400 are only provided as examples, and some of the operations and actions may be optional, combined into fewer operations and actions, or expanded into additional operations and actions without detracting from the essence of the disclosed implementations. In addition, in some implementations, the method 400 may be performed iteratively in which one or more operations may be performed for multiple communication chains in the MIMO transceiver.

In some implementations of the method 400, the precoding matrix is a first precoding matrix and the signal in the first wireless network is a first signal in the first wireless network. The method 400 may further include detecting a signal in a third wireless network from a third MIMO transceiver to a third wireless station in the third wireless network, where a coverage area of the third wireless network at least partially overlaps the coverage area of the first wireless network. The third wireless network may be the third wireless network 133 of FIG. 1B the third MIMO transceiver may be the third WAP 131 of FIG. 1B, the third wireless station may be the fifth STA 105e of FIG. 1B, and the signal in the third wireless network may be a signal from the third WAP 131 to the fifth STA 105e. The method 400 may further include determining a third symbol alignment of the signal in the third wireless network based on a preamble of the signal in the third wireless network. The method 400 may further include determining a second precoding matrix that is configured to create a null in a location where the third wireless station is physically positioned. The method 400 may further include determining a fourth symbol alignment that is synchronized with the third symbol alignment. The method 400 may further include precoding a second signal in the first wireless network using the second precoding matrix. The method 400 may further include aligning symbols of the second signal in the first wireless network according to the fourth symbol alignment.

Another example method may perform beamforming to reduce interference with concurrent transmissions of one or more overlapping wireless networks. Such a method may be performed by any suitable system, apparatus, or device, such as the first WAP 103 or the second WAP 111 of FIG. 1A or the MIMO transceiver 228 of FIG. 2, any of which may perform or direct performance of one or more of the operations associated with this method.

The method may include transmitting a signal to a wireless station of a wireless network. In some implementations, the signal may be transmitted using a precoding matrix and a symbol alignment to avoid interference to the concurrent transmissions of the overlapping wireless networks. In these and other implementations, the signal may be transmitted to avoid interference to the concurrent transmissions of the overlapping wireless networks at a location of one or more selected wireless stations of the overlapping wireless networks. In some implementations, the signal may be transmitted to the first STA 105*a* by the first WAP 103 of FIG. 1A.

In some implementations, the precoding matrix may be configured to create a null in the location of the selected wireless stations within overlapping coverage areas of the overlapping wireless networks and the wireless networks. In these and other implementations, the symbol alignment for signals to the wireless station of the wireless network may be configured based on a preamble of a detected signal to another wireless stations of the overlapping wireless networks. In some implementations, the null may be created in the location of the third STA 105*c* of FIG. 1A.

In some implementations, the method may include determining the symbol alignment for the signals to the wireless station of the wireless network. The symbol alignment may be determined based on a symbol alignment of the detected signal to another wireless station of the overlapping wireless networks. In these and other implementations, the symbol alignment for the signals to the wireless station of the wireless network may be configured such that bursts of energy of that occur in the null in the location of the selection wireless stations of the overlapping wireless networks in a time domain are positioned between symbols of the signals to the selected wireless stations of the overlapping wireless networks. In some implementations, the detected signal may be signals transmitted as part of concurrent transmission between the third STA 105*c* and the second WAP 111 of FIG. 1A.

In some implementations, the method may be performed during concurrent transmission by multiple transceivers (e.g., MIMO transceivers) of the overlapping wireless networks and the wireless network. In these and other implementations, the wireless station of the wireless network may receive the signal that is pre-coded according to the precoding matrix to avoid interference with the concurrent transmissions of the overlapping wireless networks. In addition, the signal that is pre-coded according to the precoding matrix may include the symbol alignment to improve reception.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Such computer-readable media may be any available media that may be accessed by a general-purpose or special-purpose computer. By way of example, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform or control performance of a certain function or group of functions. Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a MIMO apparatus supporting as many as N×N discrete communication streams over N antennas. In an example the MIMO apparatus signal processing units can be implemented as N×N. In various embodiments, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

CSI from any of the communication links described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, and the like.

Unless specific arrangements described herein are mutually exclusive with one another, the various implementations described herein can be combined to enhance system functionality and/or to produce complementary functions. Such combinations will be readily appreciated by those skilled in the art given the totality of the foregoing description. Likewise, aspects of the implementations may be implemented in standalone arrangements where more limited and thus specific component functionality is provided within each of the interconnected—and therefore interacting—system components albeit that, in sum, they together support, realize and produce the described real-world effect(s). Indeed, it will be understood that unless features in the particular implementations are expressly identified as incompatible with one another or the surrounding context implies that they are mutually exclusive and not readily combinable in a complementary and/or supportive sense, the totality of this disclosure contemplates and envisions that specific features of those complementary implementations can be selectively combined to provide one or more comprehensive, but slightly different, technical solutions. It will, therefore, be appreciated that the above description has been given by way of example only and that modification in detail may be made within the scope of the present invention.

The subject technology of the present invention is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses or portions thereof may be combined in any combination, and placed into an independent clause, e.g., Clauses 1, 11, and 14. The other clauses can be presented in a similar manner. The following is a non-limiting summary of some examples presented herein.

Clause 1. A first multiple input multiple output (MIMO) transceiver to communicate with a first wireless station in a first wireless network according to a first symbol alignment, the MIMO transceiver comprising:

a signal detection circuit coupled to a plurality of receive chains, the signal detection circuit configured to:

detect a signal in a second wireless network from a second MIMO transceiver to a second wireless station in the second wireless network via the receive chains, wherein a coverage area of the second wireless network at least partially overlaps a coverage area of the first wireless network; and determine a second symbol alignment of the signal in the second wireless network based on a preamble of the signal in the second wireless network; and a precoding determination circuit coupled to a plurality of transmit chains, the precoding determination circuit configured to:

determine a precoding matrix that is configured to create a null in a location where the second wireless station is physically positioned; and determine the first symbol alignment, wherein the first symbol alignment is synchronized with the second symbol alignment, wherein the transmit chains are configured to:

pre-code a signal in the first wireless network using the precoding matrix; and align symbols of the signal in the first wireless network according to the first symbol alignment.

Clause 2. The first MIMO transceiver of clause 1, wherein the signal in the second wireless network is a first signal in the second wireless network and the signal in the first wireless network is a first signal in the first wireless network, and wherein:

the signal detection circuit is further configured to:

detect a second signal in the second wireless network from the second MIMO transceiver to the second wireless station via the receive chains; and determine a third symbol alignment of the second signal in the second wireless network based on the preamble of the second signal in the second wireless network; and the precoding determination circuit is further configured to:

select the precoding matrix that is configured to create the null in the location where the second wireless station is physically positioned; and determine a fourth symbol alignment that is synchronized with the third symbol alignment, wherein the transmit chains are configured to:

pre-code a second signal in the first wireless network using the precoding matrix; and align symbols of the second signal in the first wireless network according to the fourth symbol alignment.

Clause 3. The first MIMO transceiver of clause 1, wherein the precoding matrix is a first precoding matrix and the signal in the first wireless network is a first signal in the first wireless network, and wherein:

the signal detection circuit is further configured to:

detect a signal in a third wireless network from a third MIMO transceiver to a third wireless station in the third wireless network via the receive chains, wherein a coverage area of the third wireless network at least partially overlaps the coverage area of the first wireless network; and determine a third symbol alignment of the signal in the third wireless network based on the preamble of the signal in the third wireless network; and the precoding determination circuit is further configured to:

determine a second precoding matrix that is configured to create a null in a location where the third wireless station is physically positioned; and determine a fourth symbol alignment that is synchronized with the third symbol alignment, wherein the transmit chains are configured to:

pre-code a second signal in the first wireless network using the second precoding matrix;
and align symbols of the second signal in the first wireless network according to the fourth symbol alignment.

Clause 4. The first MIMO transceiver of clause 1, wherein the signal detection circuit is further configured to determine the second wireless station is intended to receive the signal in the second wireless network from the second MIMO transceiver based on the preamble of the signal in the second wireless network.

Clause 5. The first MIMO transceiver of clause 1, wherein the signal detection circuit is configured to detect the signal in the second wireless network during a back-off period of time that the first MIMO transceiver is to delay all transmissions.

Clause 6. The first MIMO transceiver of clause 1, wherein the second wireless network is configured as a wireless local area network (WLAN) configured as a hub and spoke network around the second MIMO transceiver and the first wireless network is configured as a WLAN configured as a hub and spoke network around the first MIMO transceiver.

Clause 7. The first MIMO transceiver of clause 1, further comprising a plurality of antennas configured to wirelessly transmit the signal in the first wireless network, wherein the signal in the first wireless network is wirelessly transmitted by the antennas during a period of time that the signal in the second wireless network is still being detected.

Clause 8. The first MIMO transceiver of clause 7, wherein the signal in the first wireless network is wirelessly transmitted such that the preamble of the signal in the second wireless network and a preamble of the signal in the first wireless network are aligned in a time domain.

Clause 9. The first MIMO transceiver of clause 7, wherein the antennas are configured to wirelessly transmit the signal in the first wireless network such that the null is created by destructive interference occurring between the signal in the first wireless network being wirelessly transmitted by two or more of the antennas.

Clause 10. The first MIMO transceiver of clause 7, wherein the signal in the first wireless network is wirelessly transmitted such that bursts of energy that occur in the null in a time domain are positioned between symbols of the signal from the second MIMO transceiver.

Clause 11. A method comprising:
transmitting a signal to a wireless station of a wireless network using a precoding matrix and a symbol alignment to avoid interference to concurrent transmissions of one or more overlapping wireless networks at a location of one or more selected wireless stations of the overlapping wireless networks:
wherein the precoding matrix is configured to create a null in the location of the selected wireless stations within overlapping coverage areas of the overlapping wireless networks and the wireless network, and
wherein the symbol alignment for signals to the wireless station of the wireless network is configured based on a preamble of a detected signal to another wireless station of the overlapping wireless networks.

Clause 12. The method of clause 11, wherein during concurrent transmission by multiple transceivers of the overlapping wireless networks and the wireless network, the wireless station of the wireless network receives the signal that is pre-coded according to the precoding matrix to avoid interference with the concurrent transmissions of the overlapping wireless networks and the signal that is pre-coded according to the precoding matrix includes the symbol alignment to improve reception.

Clause 13. The method of clause 11 further comprising:
determining the symbol alignment for the signals to the wireless station of the wireless network based on a symbol alignment of the detected signal to another wireless station of the overlapping wireless networks:
wherein the symbol alignment for the signals to the wireless station of the wireless network is configured such that bursts of energy that occur in the null in the location of the selected wireless stations of the overlapping wireless networks in a time domain are positioned between symbols of the signals to the selected wireless stations.

Clause 14. A method to operate a first multiple input multiple output (MIMO) transceiver to communicate with a first wireless station in a first wireless network according to a first symbol alignment, the method comprising:
detecting a signal in a second wireless network from a second MIMO transceiver to a second wireless station in the second wireless network, wherein a coverage area of the second wireless network at least partially overlaps a coverage area of the first wireless network;
determining a second symbol alignment of the signal in the second wireless network based on a preamble of the signal in the second wireless network;
determining a precoding matrix that is configured to create a null in a location where the second wireless station is physically positioned;
determining the first symbol alignment that is synchronized with the second symbol alignment;
precoding a signal in the first wireless network using the precoding matrix; and
aligning symbols of the signal in the first wireless network according to the first symbol alignment.

Clause 15. The method of clause 14, wherein the signal in the second wireless network is a first signal in the second wireless network and the signal in the first wireless network is a first signal in the first wireless network, the method further comprising:
detecting a second signal in the second wireless network from the second MIMO transceiver to the second wireless station;
determining a third symbol alignment of the second signal in the second wireless network based on the preamble of the second signal in the second wireless network;
selecting the precoding matrix that is configured to create the null in the location where the second wireless station is physically positioned;
determining a fourth symbol alignment that is synchronized with the third symbol alignment;
precoding a second signal in the first wireless network using the precoding matrix; and
aligning symbols of the second signal in the first wireless network according to the fourth symbol alignment.

Clause 16. The method of clause 14, wherein the precoding matrix is a first precoding matrix and the signal in the first wireless network is a first signal in the first wireless network, the method further comprising:
detecting a signal in a third wireless network from a third MIMO transceiver to a third wireless station in the third wireless network, wherein a coverage area of the third wireless network at least partially overlaps the coverage area of the first wireless network;
determining a third symbol alignment of the signal in the third wireless network based on the preamble of the signal in the third wireless network;
determining a second precoding matrix that is configured to create a null in a location where the third wireless station is physically positioned;
determining a fourth symbol alignment that is synchronized with the third symbol alignment;
precoding a second signal in the first wireless network using the second precoding matrix; and
aligning symbols of the second signal in the first wireless network according to the fourth symbol alignment.

Clause 17. The method of clause 14 further comprising determining the second wireless station is intended to receive the signal in the second wireless network from the second MIMO transceiver based on the preamble of the signal in the second wireless network.

Clause 18. The method of clause 14, wherein the detecting the signal in the second wireless network occurs during a back-off period of time that transmission of the signal in the first wireless network is to be delayed.

Clause 19. The method of clause 14, wherein the signal in the first wireless network is wirelessly transmitted such that the preamble of the signal in the second wireless network and a preamble of the signal in the first wireless network are aligned in a time domain.

Clause 20. The method of clause 14, wherein the signal in the first wireless network is wirelessly transmitted such that bursts of energy that occur in the null in a time domain are positioned between symbols of the signal from the second MIMO transceiver.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A first multiple input multiple output (MIMO) transceiver configured to communicate with a first wireless station in a first wireless network according to a first symbol alignment, the first MIMO transceiver comprising:
   a signal detection circuit coupled to a plurality of receive chains, the signal detection circuit configured to:
      detect a signal in a second wireless network from a second MIMO transceiver to a second wireless station in the second wireless network via the receive chains, wherein a coverage area of the second wireless network at least partially overlaps a coverage area of the first wireless network; and
      determine a second symbol alignment of the signal in the second wireless network based on a preamble of the signal in the second wireless network; and
   a precoding determination circuit coupled to a plurality of transmit chains, the precoding determination circuit configured to:
      determine a precoding matrix that is configured to create a null in a location where the second wireless station is physically positioned; and
      determine the first symbol alignment, wherein the first symbol alignment is synchronized with the second symbol alignment, and wherein the transmit chains are configured to:
         pre-code a signal in the first wireless network using the precoding matrix; and
         align symbols of the signal in the first wireless network according to the first symbol alignment.

2. The first MIMO transceiver of claim 1, wherein the signal in the second wireless network is a first signal in the second wireless network and the signal in the first wireless network is a first signal in the first wireless network, and wherein:
   the signal detection circuit is further configured to:
      detect a second signal in the second wireless network from the second MIMO transceiver to the second wireless station via the receive chains; and
      determine a third symbol alignment of the second signal in the second wireless network based on a preamble of the second signal in the second wireless network; and
   the precoding determination circuit is further configured to:
      select the precoding matrix that is configured to create the null in the location where the second wireless station is physically positioned; and
      determine a fourth symbol alignment that is synchronized with the third symbol alignment, wherein the transmit chains are configured to:
         pre-code a second signal in the first wireless network using the precoding matrix; and
         align symbols of the second signal in the first wireless network according to the fourth symbol alignment.

3. The first MIMO transceiver of claim 1, wherein the precoding matrix is a first precoding matrix and the signal in the first wireless network is a first signal in the first wireless network, and wherein:
   the signal detection circuit is further configured to:
      detect a signal in a third wireless network from a third MIMO transceiver to a third wireless station in the third wireless network via the receive chains, wherein a coverage area of the third wireless network at least partially overlaps the coverage area of the first wireless network; and
      determine a third symbol alignment of the signal in the third wireless network based on a preamble of the signal in the third wireless network; and
   the precoding determination circuit is further configured to:
      determine a second precoding matrix that is configured to create a null in a location where the third wireless station is physically positioned; and
      determine a fourth symbol alignment that is synchronized with the third symbol alignment, wherein the transmit chains are configured to:
         pre-code a second signal in the first wireless network using the second precoding matrix; and
         align symbols of the second signal in the first wireless network according to the fourth symbol alignment.

4. The first MIMO transceiver of claim 1, wherein the signal detection circuit is further configured to determine the second wireless station is intended to receive the signal in the second wireless network from the second MIMO transceiver based on the preamble of the signal in the second wireless network.

5. The first MIMO transceiver of claim 1, wherein the signal detection circuit is further configured to detect the signal in the second wireless network during a back-off period of time that the first MIMO transceiver is to delay all transmissions.

6. The first MIMO transceiver of claim 1, wherein the second wireless network is configured as a wireless local area network (WLAN) configured as a hub and spoke network around the second MIMO transceiver and the first wireless network is configured as a WLAN configured as a hub and spoke network around the first MIMO transceiver.

7. The first MIMO transceiver of claim 1, further comprising a plurality of antennas configured to wirelessly transmit the signal in the first wireless network, wherein the signal in the first wireless network is wirelessly transmitted by the antennas during a period of time that the signal in the second wireless network is still being detected.

8. The first MIMO transceiver of claim 7, wherein the signal in the first wireless network is wirelessly transmitted such that the preamble of the signal in the second wireless network and a preamble of the signal in the first wireless network are aligned in a time domain.

9. The first MIMO transceiver of claim 7, wherein the antennas are configured to wirelessly transmit the signal in the first wireless network such that the null is created by destructive interference occurring between the signal in the first wireless network being wirelessly transmitted by two or more of the antennas.

10. The first MIMO transceiver of claim 7, wherein the signal in the first wireless network is wirelessly transmitted such that bursts of energy that occur in the null in a time domain are positioned between symbols of the signal from the second MIMO transceiver.

11. A method comprising:
transmitting a first signal to a wireless station of a wireless network using a precoding matrix and a symbol alignment to avoid interference to concurrent transmissions of one or more overlapping wireless networks at a location of one or more selected wireless stations of the overlapping wireless networks:
wherein the precoding matrix is configured to create a null in the location of the selected wireless stations within overlapping coverage areas of the overlapping wireless networks and the wireless network, and
wherein the symbol alignment for second signals to the wireless station of the wireless network is configured based on a preamble of a detected signal to another wireless station of the overlapping wireless networks.

12. The method of claim 11, wherein during concurrent transmission by multiple transceivers of the overlapping wireless networks and the wireless network, the wireless station of the wireless network receives the first signal that is pre-coded according to the precoding matrix to avoid interference with the concurrent transmissions of the overlapping wireless networks and the first signal that is pre-coded according to the precoding matrix includes the symbol alignment to improve reception.

13. The method of claim 11 further comprising:
determining the symbol alignment for the second signals to the wireless station of the wireless network based on a symbol alignment of the detected signal to another wireless station of the overlapping wireless networks:
wherein the symbol alignment for the second signals to the wireless station of the wireless network is configured such that bursts of energy that occur in the null in the location of the selected wireless stations of the overlapping wireless networks in a time domain are positioned between symbols of third signals to the selected wireless stations.

14. A method of operating a first multiple input multiple output (MIMO) transceiver to communicate with a first wireless station in a first wireless network according to a first symbol alignment, the method comprising:
detecting a signal in a second wireless network from a second MIMO transceiver to a second wireless station in the second wireless network, wherein a coverage area of the second wireless network at least partially overlaps a coverage area of the first wireless network;
determining a second symbol alignment of the signal in the second wireless network based on a preamble of the signal in the second wireless network;
determining a precoding matrix that is configured to create a null in a location where the second wireless station is physically positioned;
determining the first symbol alignment, wherein the first symbol alignment is synchronized with the second symbol alignment;
precoding a signal in the first wireless network using the precoding matrix; and
aligning symbols of the signal in the first wireless network according to the first symbol alignment.

15. The method of claim 14, wherein the signal in the second wireless network is a first signal in the second wireless network and the signal in the first wireless network is a first signal in the first wireless network, the method further comprising:
detecting a second signal in the second wireless network from the second MIMO transceiver to the second wireless station;
determining a third symbol alignment of the second signal in the second wireless network based on a preamble of the second signal in the second wireless network;
selecting the precoding matrix that is configured to create the null in the location where the second wireless station is physically positioned;
determining a fourth symbol alignment that is synchronized with the third symbol alignment;
precoding a second signal in the first wireless network using the precoding matrix; and
aligning symbols of the second signal in the first wireless network according to the fourth symbol alignment.

16. The method of claim 14, wherein the precoding matrix is a first precoding matrix and the signal in the first wireless network is a first signal in the first wireless network, the method further comprising:
detecting a signal in a third wireless network from a third MIMO transceiver to a third wireless station in the third wireless network, wherein a coverage area of the third wireless network at least partially overlaps the coverage area of the first wireless network;
determining a third symbol alignment of the signal in the third wireless network based on a preamble of the signal in the third wireless network;
determining a second precoding matrix that is configured to create a null in a location where the third wireless station is physically positioned;
determining a fourth symbol alignment that is synchronized with the third symbol alignment;
precoding a second signal in the first wireless network using the second precoding matrix; and
aligning symbols of the second signal in the first wireless network according to the fourth symbol alignment.

17. The method of claim 14 further comprising determining the second wireless station is intended to receive the signal in the second wireless network from the second MIMO transceiver based on the preamble of the signal in the second wireless network.

18. The method of claim 14, wherein the detecting the signal in the second wireless network occurs during a back-off period of time that transmission of the signal in the first wireless network is to be delayed.

19. The method of claim 14, wherein the signal in the first wireless network is wirelessly transmitted such that the preamble of the signal in the second wireless network and a preamble of the signal in the first wireless network are aligned in a time domain.

20. The method of claim 14, wherein the signal in the first wireless network is wirelessly transmitted such that bursts of energy that occur in the null in a time domain are positioned between symbols of the signal from the second MIMO transceiver.

\* \* \* \* \*